US 6,643,991 B1

(12) United States Patent
Moyes (10) Patent No.: US 6,643,991 B1
(45) Date of Patent: Nov. 11, 2003

(54) FIRE DOOR AND METHOD OF ASSEMBLY (75) Inventor: Hartley Moyes, West Yorkshire (GB)

(73) Assignee: Premdor International, Inc., Bridgetown (BB)

( * ) Notice: Subject to any disclaimer, the term of this patent is extended or adjusted under 35 U.S.C. 154(b) by 0 days.

(21) Appl. No.: 09/968,015

(22) Filed: Oct. 2, 2001

(51) Int. Cl.[7] .............................. E04C 2/54; E04C 2/32
(52) U.S. Cl. ..................... 52/784.11; 52/232; 52/309.3; 52/309.15; 52/455; 52/784.13; 52/784.15; 52/802.1; 49/504; 428/902
(58) Field of Search ............................. 52/204.1, 309.3, 52/784.1, 232, 455, 784.13, 784.15, 802.1, 309.13, 309.17, 309.15; 49/399, 501, 504, 505; 428/92

(56) References Cited

U.S. PATENT DOCUMENTS

| 2,549,205 | A | * | 4/1951 | Katz et al. |
| 2,910,739 | A | * | 11/1959 | Snitker |
| 3,855,741 | A | * | 12/1974 | Semon .......................... 52/19 |
| 3,873,332 | A | * | 3/1975 | McCreight .................. 106/109 |
| 3,885,980 | A | * | 5/1975 | Noone ........................ 106/109 |
| 3,916,804 | A | * | 11/1975 | Noone ........................ 109/78 |
| 4,043,862 | A | | 8/1977 | Roberts |
| 4,075,804 | A | * | 2/1978 | Zimmerman ................. 52/232 |
| 4,104,828 | A | | 8/1978 | Naslund et al. |
| 4,343,127 | A | | 8/1982 | Greve et al. |
| 4,367,614 | A | * | 1/1983 | Warwick ....................... 52/455 |
| 4,610,119 | A | * | 9/1986 | Bench, Sr. .................. 52/309.3 |
| 4,748,771 | A | * | 6/1988 | Lehnert et al. .............. 49/399 |
| 4,811,538 | A | | 3/1989 | Lehnert et al. |
| 4,850,173 | A | * | 7/1989 | Beyer et al. .................. 52/741 |
| 4,993,203 | A | * | 2/1991 | Tanaka et al. ................ 52/232 |
| 5,309,690 | A | * | 5/1994 | Symons ...................... 52/309.9 |
| 5,347,780 | A | * | 9/1994 | Richards et al. ........... 52/204.1 |
| 5,395,571 | A | | 3/1995 | Symons |
| 5,601,919 | A | | 2/1997 | Symons |
| 5,879,600 | A | | 3/1999 | Symons |
| 6,115,976 | A | | 9/2000 | Gomez |
| 6,248,812 | B1 | | 6/2001 | Symons |
| 6,248,822 | B1 | | 6/2001 | Symons |
| 6,337,107 | B1 | | 1/2002 | Symons |
| 6,340,389 | B1 | | 1/2002 | Klus |
| 6,451,153 | B1 | | 9/2002 | Symons |

FOREIGN PATENT DOCUMENTS

| DE | 29 11 747 | 3/1979 |
| GB | 1012849 | 12/1965 |
| GB | 1141066 | 1/1969 |
| GB | 2036839 | 7/1980 |
| GB | 2085514 | 4/1982 |
| GB | 2087178 | 5/1982 |
| GB | 2230040 | 10/1990 |
| WO | WO 98/37032 | 8/1998 |

OTHER PUBLICATIONS

Sealmaster, Intumescent Seals, pp. 8–21.

* cited by examiner

Primary Examiner—Carl D. Friedman
Assistant Examiner—Yvonne M. Horton
(74) Attorney, Agent, or Firm—Liniak, Berenato & White, LLC (57) ABSTRACT The invention is directed to a fire door having a core, stiles, and rails formed of resin bonded exfoliated vermiculite, wherein the core has a density which exceeds that of the stiles and rails. The invention is also directed to such a fire door additionally having an intumescent material placed on some or all of the exposed edges of the stiles and rails.

47 Claims, 4 Drawing Sheets

FIRE DOOR AND METHOD OF ASSEMBLY

FIELD OF THE INVENTION

The present invention is directed to a fire door and a method for its manufacture. More particularly, a fire door made of resin and vermiculite that is suitable for use as a decorative entry door is disclosed.

BACKGROUND

The use of fire doors in buildings is an important factor in avoiding injuries and loss of lives and in preventing property damage as a result of the door's ability to impede the spread of fire. In the interest of public safety, standards have been set by governmental agencies, building code authorities, and insurance companies for the installation and performance of door assemblies which retard the passage or spread of fire. Building codes require that fire-resistant door assemblies pass standard industry-wide tests that are an evaluation of the fire-resistant properties of the door assembly in relation to heat and flame for a specified duration.

Fire doors have always presented one or more of several different problems to architects, designers, and builders. Fire doors are sometimes very expensive and complicated to manufacture, or require expensive materials for their construction. Still other fire doors transmit heat readily, or are so heavy that they require special construction in the door frame before they can be hung, or require special hardware. Because of the costs incurred overcoming one or more these problems, many fire doors are too expensive to manufacture and are not used as often as might be desirable.

A fire door must have certain basic properties in order to meet standard industry-wide fire endurance tests, such as those in accordance with UL 10C (1998), NFPA 252 (1995), and UBC 7-2 (1997). In these tests, the door and frame are exposed to intense heat, such as that generated by fire in a burning building. Exemplary conditions of such tests involve exposing the door assembly to temperatures which progressively increase within the range of 1750° F. to 1800° F. for an exposure period up to 1½ hours. A door meeting these standards is rated as a 90 minute door. The disclosed door may actually withstand longer term exposure to fire conditions. Basic properties that must be possessed by door cores during exposure to such tests are discussed below.

The fire door typically has a core, which itself must have good integrity during exposure to fire, that is, it must resist heat transfer, burning, melting, spalling, cracking, bowing or deteriorating in any way which would cause the temperature, on the side of the door not exposed to the fire, to rise to the extent that the combustible veneer on the unexposed side of the door burns or chars substantially.

During exposure to heat, the core must also exhibit good dimensional stability. It must remain relatively stable and resist warping or shrinking to the extent that it remains in contact with the banding (stiles and rails) around its perimeter. Separation from the banding can cause the combustible components to burn away prematurely, allowing fire to penetrate the opening.

In addition to the foregoing properties, the core must be resistant to heat transmission such that the transfer of heat from the fire-exposed side of the door to the unexposed side is deterred. Otherwise, ignition and possible spread of fire may result from premature charring or burning of the combustible veneer of the unexposed side on the door.

Another characteristic required of the core is that it must retain its integrity when exposed to a hose stream. After the door is removed from a heat source used for conducting the fire endurance test, it is subjected to the sudden cooling effects of a hose stream. The core must retain its integrity under the pressure of the hose stream.

In addition to possessing the foregoing properties, fire doors must, in order to be commercially acceptable, have other properties that are related to the manufacture, installation and service of the fire resistant door. For example, the door must have sufficient strength, yet be light enough in weight to allow it to be hung and used without becoming unattached from its mounting. One measure of this property is the screw-pull strength, i.e., the force required to pull out a screw installed into the door. Another test is the ability to withstand repeated cycling, i.e., the door's ability to satisfactorily withstand repeated opening and closing.

Those skilled in the art will recognize that there is a need for a fire door which is effective to retard the penetration and spread of fire or the transmission of heat. Yet a further need in the art is a relatively strong and durable fire door that is sufficiently light to avoid the trouble and expense of special door frame structures on which to hang the fire door, and is relatively easy and inexpensive to manufacture.

SUMMARY OF THE INVENTION

It is therefore a primary object of the invention to provide a fire door meeting these needs in the art. More particularly, it is an object to provide a fire door well suited for entry doors.

The inventor has discovered that these needs may be met by a fire door which comprises a generally rectangular core formed of resin bonded exfoliated vermiculite having a predetermined density. A pair of stiles are secured to and extend along opposed edges of the core, and a pair of rails are secured to and extend along opposed edges of the core. The stiles and rails are formed of resin bonded exfoliated vermiculite having a density exceeding the density of the core.

A fire door, according to another aspect of the invention, comprises at least a first rectangular core formed of resin bonded exfoliated vermiculite. The core has first and second major surfaces and four peripheral edges. A recess is formed in and extends along each of the edges. A pair of stiles and a pair of rails are provided, wherein each of the stiles and the rails are formed from resin bonded exfoliated vermiculite. Each of the stiles and rails has a tenon extending therefrom, and each of the tenons is adhesively secured within an associated one of the recesses.

A method of assembling a fire door, according to yet another aspect of the invention, comprises the following steps. A generally rectangular door core formed from resin bonded exfoliated vermiculite is provided. A pair of rails and a pair of stiles formed from resin bonded exfoliated vermiculate are also provided. The stiles and rails are adhesively secured to the peripheral edges of the core.

DETAILED DESCRIPTION

The inventor has found that a fire door having improved fire resistance properties may be obtained by using resin-bonded exfoliated vermiculite (hereinafter RBEV composite) for a core or cores, as well as stiles and rails, wherein the RBEV composite used for the stiles and rails has a density exceeding that of the RBEV composite used for the core. While being exposed to fire temperatures, this novel fire door resists burning, melting, spalling, cracking, delamination, splitting, deteriorating, dimensional deformation and bowing at fire temperatures, while at the same time retaining its integrity when exposed to a hose stream. The inventive fire door also provides remarkable screw-pull strengths for attaching door hardware, such as hangers, hinges, door closures, flush bolts and locks.

These improved properties are at least partly the product of employing RBEV composite at a first density for the rails and/or stiles, and RBEV composite at a second and lower density for the core. Because of the increased dimensions of the lower density material of the core, the coefficient of thermal expansion must be taken into account. Should the core expand too much, then the door will bow within the frame and possibly fracture. The RBEV composite prepared at a lower density has a smaller thermal coefficient of expansion than that of the higher density material, and, as a result, the core expands less than if made from RBEV having a higher coefficient of thermal expansion. Thus, the structural integrity of the door is maintained, and the bowing and cracking which would otherwise occur in a fire door having the same density of RBEV for each of the core, stiles, and rails, is avoided.

The inventor has also found that a fire door having improved fire resistance properties may be obtained by using RBEV composite for the core and rails and/or stiles, wherein the core has been impregnated with water and then dried to a predetermined moisture content. Since the rails and/or stiles serve to provide material for forming support structures and not fire resistant cores, water impregnation of the rails and/or stiles is not necessary because the rails and/or stiles only present a very small portion of the surface area of a fire door exposed to a fire. As a result, the core has a higher crystalline or chemically bound water content than that of rails and/or stiles.

The inventor has also found that the rails and stiles in the fire door of the present invention exhibit higher screw-pull strengths when they are made of the RBEV composite prepared at a higher density than that of a lower density. The solids in a hardened slab of the higher density RBEV composite, including exfoliated vermiculite and glass fibers, or other similar reinforcement therein, are substantially oriented in a plurality of parallel layers resembling layers of cellulose materials or "grain". When the plurality of parallel layers are oriented parallel to an outward-facing edge of the slab, threaded fasteners inserted into the slab will be held by a great number of such layers, and thus are held by the slab with up to three times the force than compared to slabs without a plurality of layers oriented in such a manner.

The inventor has also found that a lower resin content in the RBEV composite provides an RBEV composite slab with a greater flexibility, thereby achieving a higher screw-pull strength.

In order to avoid splitting or delamination of the fire door at the rail/core or stile/core interface when the door is exposed to typical fire temperatures, the inventor has found that a tenon joint, or a tenon joint in combination with an adhesive, is a stronger means of joining components of a fire door together than compared to just adhesive. Each of the stiles and/or the rails may have a tenon that fits into a recess in the core. The stile or rail tenon and core recess configuration is more resistive to splitting because the higher density stile or rail tenon has a higher thermal coefficient of expansion than does the recess of the core enveloping the stile or rail tenon. As a result, the expansion force of the tenon holds it inside the recess more securely, but without splitting or cracking the core. If desired, the outer edges of the core may instead be provided with tenons that fit into recesses formed in the rails and/or stiles. Also, a butt joint may be used, eliminating the need to fabricate the tenon and associated recess.

Many conventional fire doors using inorganic material for the core often have wood veneers over their major sides as well as wood lippings over outward-facing surfaces of the rails and stiles in order to present an aesthetically pleasing appearance to consumers. During exposure to a fire, the veneer on the fire-exposed surface will combust rather quickly and the lippings will char and erode. This charring and erosion leaves an undesirably large gap in between the door frame and the rails and stiles that allows the fire to bypass the core ignite the veneer on the non-exposed side.

In order to remedy this disadvantage and help contribute to the door's stability under fire, the inventive door may have an intumescent strip disposed on the outside perimeter of the fire door on the exposed edges of the stiles and/or rails. The intumescent material expands rapidly upon exposure to heat and thus holds the door firmly in place inside a door frame at fire temperatures, precludes smoke from entering a room with such a door, and helps prevent the spread of fire from the fire-exposed surface to the door surface not exposed to fire. Preferably the intumescent material selected is one that will expand to about 50 times its original volume when raised to a temperature of about 150° C.

The intumescent material is in the form of a strip or ribbon and is disposed within a continuous groove that extends longitudinally along outward-facing edges of the top rail and/or both stiles. Alternatively, the groove may be omitted and the intumescent material be disposed directly upon the exposed edges of the top rail and/or stiles. In either case, the intumescent material may be encapsulated by an encapsulating material, such as semi-rigid or rigid polyvinyl chloride (PVC) coextruded with the intumescent material in a ribbon or strip. The intumescent material, whether encapsulated or not, may be covered by a protective layer that may also cover substantially all of each of the exposed outward-facing edges of the rails and/or stiles. Suitable intumescent materials include LE 47.1 and LE 49.1 available from Lorient Polyproducts, Interdens Type 5 or Type 15 available from Wolman of BASF, and Palusol also available from BASF.

Many conventional fire doors also suffer from an additional disadvantage. In addition to charring of any wood lippings that may be present during exposure to a fire, many conventional inorganic material-containing fire door cores will suffer from erosion or spalling. The spalling incurred may reduce the original thickness of the fire door by as much as 30–40%. The erosion and spalling affects not only the thickness but also the height and width. This is in part due to thermal contraction as any moisture initially present is driven off, as well consumption and/or granulation of the inorganic material from the thermal energy of the fire.

The inventor has also found that the inventive core does not suffer from these disadvantages, thus rendering an intumescent strip non-essential to a fire door containing the core. The obviation of an intumescent strip is at least partly due to the behavior of the inventive core during exposure to a fire. As the temperature of the inventive core increases, the surfaces of the core exposed to the fire will actually expand and the core will tend to bow inward toward the fire-exposed side. The width-wise distortion of the core is limited by the existence of a frame around the fire door containing the core. Therefore, pressure will build up at the outward-facing edges of the fire door as a result of the distortion of the core and the existence of the door frame. As a result, the intumescent material normally needed in many conventional fire doors is not needed to make up for a gap due to charring and erosion. A minor amount of charring of a center portion of the top rail may result when an intumescent is not employed, because of inward bowing of the core and because any height-wise expansion of the door is not restrained by the frame as it does upon the stiles, i.e., the bottom rail may have a clearance of about 20 mm. In order to overcome this potential charring, the length of the top rail is chosen such that it is marginally shorter than the width of the core, thereby limiting the expansion and distortion of the rail that is associated with the core. When the inventive fire door without intumescent has been subjected to standard industry-wide fire endurance tests, such as those in accordance with UL 10C (1998), the fire door has passed easily.

In order to manufacture a door, slabs of hardened RBEV composite material must first be prepared. The resin should be gently mixed with exfoliated vermiculite, using care to not break up the particles of exfoliated vermiculite, to form a mixture. Alternatively, the RBEV composite can additionally contain a hydraulic binder, a catalyst, a release agent and fibrous reinforcement. If these ingredients are desired, the resin is first mixed with the hydraulic binder, the catalyst and the release agent to form a submixture. This submixture is then gently mixed with the exfoliated vermiculite and fibrous reinforcement to form a mixture, using care, as discussed above, to avoid breaking up the vermiculite particles. Preferably the resin, hydraulic binder, catalyst, release agent, exfoliated vermiculite and fibrous reinforcement are added in amounts which will result in a door not exceeding 110 pounds in weight, when the door is a 3 ft. by 7 ft. door. A larger door will weigh proportionately more. Thus, the mixture may contain resin and exfoliated vermiculite, and also additionally contain hydraulic binder, a catalyst and a release agent.

This mixture is then deposited into a compression mold. The mold is preferably preheated, but not to a temperature greater than a reaction temperature of the resin. If the mold temperature is higher than the reaction temperature of the resin, the resin will start to prematurely cure before the final shape of the slab of RBEV composite is formed.

The mixture-filled, heated mold is then transferred to a heated press, and pressure is applied to the press in order to cause the mixture to harden or cure into a slab. The pressure is preferably about 150–400 p.s.i. if a lower density slab is desired (such as that used for the core), or about 800–1200 p.s.i. if a higher density slab is desired (such as that used for the stiles and rails). In order to develop parallel-oriented layers in the slab produced from this process, pressure should be slowly increased and held constant for a predetermined period of time sufficient to develop such a multi-layered structure. The temperature in the heated press should be kept below the exfoliated vermiculite delamination temperature. Preferably the heated press temperature is kept below 200° C. Care should be taken to degas or release volatile components during compression.

The hardened slab is then removed from the mold, impregnated with either water or steam, and then dried to a predetermined moisture content. This is important to activate water-binding properties of the exfoliated vermiculite and hydraulic binder, properties which will be discussed in greater detail below. If any type of gypsum is selected as the hydraulic binder, the hardened slab should be impregnated long enough to fully hydrate the gypsum. After hydration, the impregnated, hardened slab is preferably dried to a moisture level of about 10–14% by wt.

The exfoliated vermiculite used for the RBEV composite is a special form of a vermiculite. Vermiculites are well known materials chosen from any of a group of micaceous hydrated silicate minerals, and normally exist in laminar form. Exfoliated vermiculite is produced by applying heat to vermiculite, wherein the water of hydration contained in the vermiculite is released as steam and thus explosively expands between individual lamina or stacks of laminae, so that the exfoliated vermiculite ends up having a size of about 15 to 25 times greater than vermiculite before exfoliation.

By itself, exfoliated vermiculite is an excellent thermal insulator and thus serves to deter the conductance of heat from one side to another side of a door containing it therein. The hydraulic binder, gypsum, enhances the core's insulative properties by its ability to bind water of hydation. When heat is applied to a door core made of hydrated gypsum, great quantities of thermal energy are used up in transforming the water from a liquid to a gaseous form, thereby deterring overheating and possible combustion of combustible door components.

The exfoliated vermiculite particle size is preferably either Grade 4 or Grade 5, with Grade 5 preferred. Grades 4 and 5 exfoliated vermiculite have nominal particle sizes of about between 1.0 mm and 0.5 mm, respectively, but contain distributions of different particle sizes. The table below shows the preferred distribution of particle sizes. Suitable exfoliated vermiculite may be obtained from W. R. Grace & Co. under the name Zonolite #5, Virginia Vermiculite and Palabara Mining in South Africa.

| PARTICLE SIZE | PERCENT BY WEIGHT |
| --- | --- |
| 0.6 mm | 0–15% |
| 0.3 mm | 0–20% |
| 0.15 mm | 30–76% |

The resin is used in the RBEV composite in order to bind the exfoliated vermiculite and provide strength to the RBEV composite, enabling the RBEV composite to be used as a freestanding structure. The resin is preferably a novolac resin, which is a resin based on phenol and formaldehyde, wherein the molar ratio of phenol to formaldehyde exceeds 1. Preferably, the novolac resin has a reaction temperature starting at about 120–130° C., at which the resin begins to flow. The resin should be heated to about 145–150° C., to provide the binding and strengthening properties discussed above. The novolac resin may be used in combination with a catalyst. This catalyst upon decomposition with heat will give rise to a source of formaldehyde, and thus induce condensation and curing of the resin to form a hard, strong and insoluble three-dimensional stable network with minimal shrinkage. The novolac resin is used in finely divided powder form. It is also desirable to employ a novolac resin that flows at a temperature less than the decomposition/activation temperature of the catalyst, and a catalyst whose decomposition/activation temperature substantially overlaps the reaction temperature of the novolac resin. Preferably, the novolac resin begins to flow at 100–130° C. Examples of suitable novolac resins include 6240 or 3174 or SSA 602N obtainable from Schenectady Corp. (South Africa), Plyophen 24–700, Plyophen 602N or Varcum 3337 obtainable from PRP Resins Division of Sentrachem Ltd. (South Africa). Other suitable resins may be obtained from Rutgers-Plenca, LLC, Occidental Chemical Corporation, or Borden Chemicals.

A release agent is desirable in the composition in order to assist removing a hardened slab of the composition from the mold discussed above. It may be added in an amount corresponding to 0.5–1.0% by wt. of the resin. Suitable surface release agents includes a resin solution in aliphatic hydrocarbon known as Xtend 19 SAM available from Axel Plastics, and a resinous emulsion known as MoldWiz EM-1212SF2 available from Axel Plastics Research Laboratories, Inc. Hard chrome plating of the tool may be used. An internal release agent may instead be used as part of the mixture. Suitable internal release agents include various products known under the general name MoldWiz (also available from Axel Plastics Research Laboratories, Inc.) with the following product numbers: INT-1E-117, INT-2E/AP, INT-2E-DS, INT-AM150, INT-4E-11S, INT-4E-11CC, INT-4E-18CC, INT-12, INT-1312MS, INT-1425PNP and INT-1830PN. A combination of a surface release agent, hard chrome plating of the tool, and an internal release agent may be used. Very smooth tool steel surfaces are superior to hard chrome plating, preferably having a 2–25 µm range in center line average.

The hydraulic binder in the RBEV composite is useful to complement the hydrated exfoliated vermiculite in deterring overheating of a door core. Similar to the hydrated exfoliated vermiculite, the water of hydration contained within the hydraulic binder is released upon exposure to heat. The hydraulic binder may be chosen from one or more of gypsum, hydrated gypsum, Portland cement, high alumina cement, gypsum cement, -calcium sulphate hemihydrate, -calcium sulphate hemihydrate, magnesium oxychloride, magnesium oxysulphate, calcium sulphoaluminate cement, an alkali silicate, and ground granulated blast furnace slag. Preferably, the hydraulic binder is gypsum, more preferably calcium sulfate- or -hemihydrate. Calcium sulfate-hemihydrate is most preferred. Suitable reclaimed gypsum may be obtained from BPB Gypsum under the name Standard Rhinoplaster. Suitable mineral gypsum can be obtained from International Minerals Incorporated, providing it has a high purity.

The fibrous reinforcement in the RBEV composite acts to increase the tensile strength, rigidity and structural integrity of a core made of RBEV composite. As the RBEV composite is mixed, the resin starts to bond to the surface of fibers contained in the fibrous reinforcement. When the RBEV is cured, the resin and fibrous reinforcement forms a strong, rigid network of fibers bonded to cured resin, thereby further enhancing the RBEV composite's ability to be used as a freestanding structure. The fibrous reinforcement may be chosen from one or more of glass fibers, chopped strand glass fibers, inorganic fibers, and Dralon fibers. Suitable glass fibers include 12.5 mm chopped strand glass fiber available from Owens Corning or PPG. The fiber length may be from 4 mm to 12.5 mm. The fibers should be dispersed within the mix in order to enhance the screw pull strength.

The lower density RBEV composite may contain about 10–50% by wt. hydraulic binder, 8–20% by wt. resin, and 0–5% by wt. fibrous reinforcement, and 50–70% by wt. exfoliated vermiculite. Preferably, the lower density RBEV composite contains about 20–30% by wt. hydraulic binder, about 8–12% by wt. resin, about 2–5% by wt. fibrous reinforcement, and 50–70% by wt. exfoliated vermiculite. More preferably, the lower density RBEV composite contains about 28% by wt. hydraulic binder, about 12% resin, about 3% fibrous reinforcement, and about 57% by wt. exfoliated vermiculite. The lower density RBEV composite may have a density of about 350–600 kg/m$^3$, preferably 425–525 kg/m$^3$, more preferably about 500 kg/m$^3$.

The higher density RBEV composite may contain about 1–30% by wt. hydraulic binder, about 5–12% by wt. resin, 5–20% by wt. fibrous reinforcement, and 55–85% by wt. exfoliated vermiculite. Preferably, the higher density RBEV composite contains about 20% by wt. hydraulic binder, about 8% by wt. resin, about 16% by wt. glass fiber, and about 56% exfoliated vermiculite. The higher density RBEV composite may have a density of about 900–1300 kg/m$^3$, preferably 1000–1200 kg/m$^3$, more preferably about 1250 kg/m$^3$.

Figure 1:
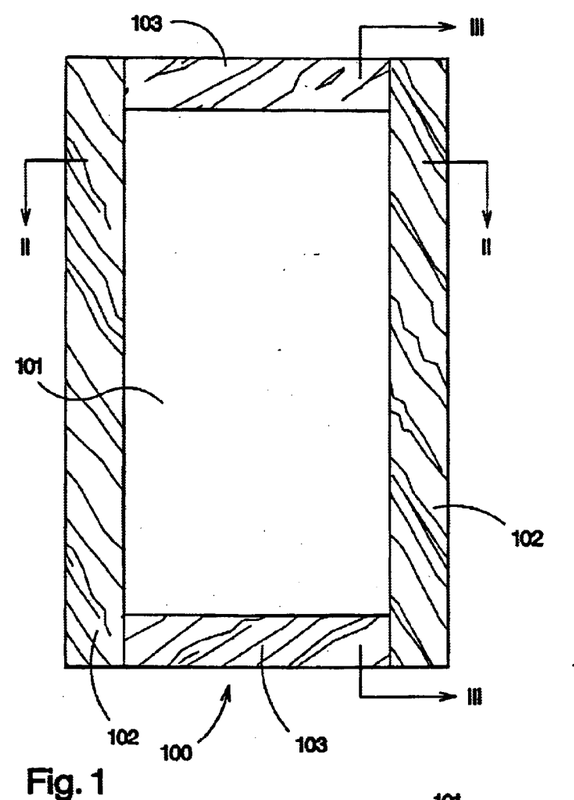
FIG. 1 is a plan view of a first embodiment of the fire door.

As best shown in FIG. 1, the fire door 100 has a core 101, two stiles 102, and two rails 103. The core 101 (and cores of other embodiments of the invention) is made of lower density RBEV composite, while the stiles 102 and rails 103 (and stiles and rails of other embodiments of the invention) are made of higher density RBEV composite. The stiles 102 and rails 103 may be secured to the core 101 with an adhesive, such as a hot melt adhesive, a polyurethane glue, or a polyvinyl acetate glue. The fire door 100 is designed to be a 90 minute fire door according to tests in accordance with UL 10C (1998), NFPA 252 (1995), or UBC 7-2 (1997).

Figures 6, 7, 8, 9:
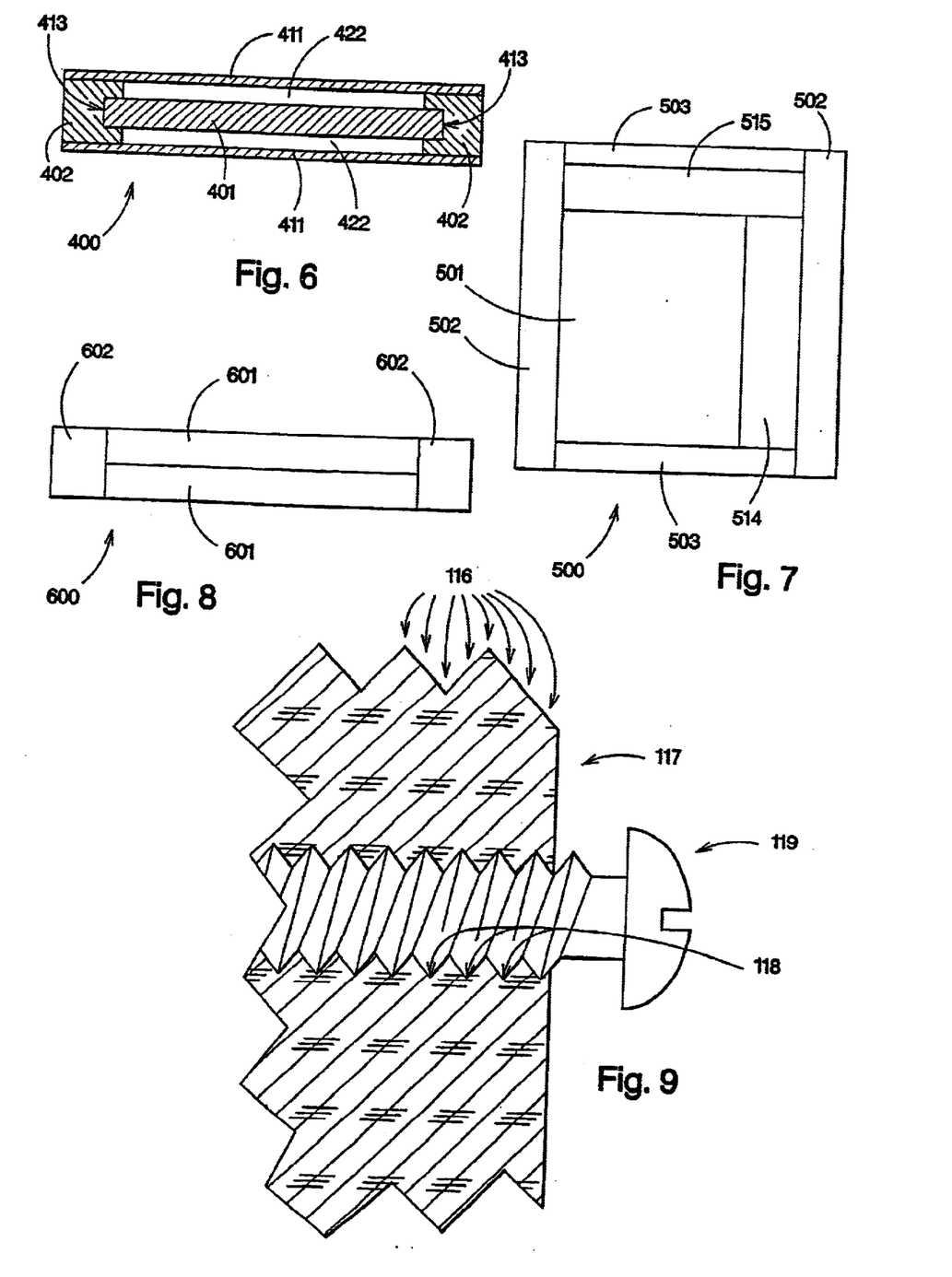
FIG. 6 is a cross-sectional view of a fourth embodiment.
FIG. 7 is a plan view of a fifth embodiment.
FIG. 8 is a cross-sectional view of a sixth embodiment.
FIG. 9 is a fragmentary cross-sectional view of a threaded fastener inserted into the fire door of FIG. 1.

As best shown in FIG. 9, solids in the RBEV composite (including fibrous reinforcement and exfoliated vermiculite) are oriented, i.e., they have a grain formed by a plurality of aligned layers 116 that hold individual threads 118 of a threaded fastener 119 inserted into the RBEV composite. This orientation of layers is important for increased screw-pull strengths, a feature of interest when door hardware such as hangers, are fastened to the stiles. The plurality of layers in the RBEV composite of the stiles 102 are oriented parallel to the outward-facing edges of the stiles 102. The plurality of layers in the RBEV of the rails 103 are oriented parallel to the outward-facing edges of the rails 103. Since the stiles and rails are oriented perpendicular to one another, the vermiculite forming the rails is oriented in a plurality of aligned layers that are perpendicular to the plurality of aligned layers formed by vermiculite in the stiles.

Figure 2:
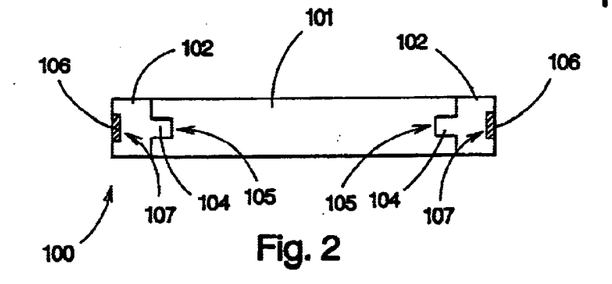
FIG. 2 is a cross-sectional view taken along the line II—II of FIG. 1.

As illustrated in FIG. 2, each of the stiles 102 may have a tenon 104 that fits inside recesses 105 formed in the core 101 by machining or otherwise. Alternatively, the core 101 could have a tenon that fits inside a recess in each of the stiles 102. An intumescent material 106 is disposed in grooves 107 formed by machining or otherwise in the outward-facing edges of both of the stiles 102 and the top rail 103. The intumescent material 106 and grooves 107 are preferably aligned with the tenons 104. In the fire door 100, the grooves 107 may be omitted and the intumescent material 106 may be disposed directly upon outward-facing edges of the stiles 102 and top rail 103. The intumescent material 106 is in the form of a strip or ribbon and may be encapsulated within an encapsulating material as discussed above. The intumescent material 106 and grooves 107 need not be placed on all of the exposed edges of both of the stiles 102 and the top rail 103.

Figure 3:
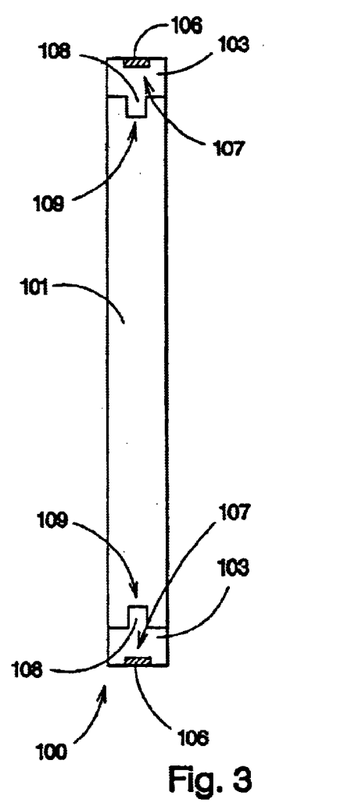
FIG. 3 is a cross-sectional view taken along the line III—III of FIG. 1.

As shown in FIG. 3, each of the rails 103 is configured to have a tenon 108 that fits inside recesses 109 formed in the core 101. Alternatively, the core 101 could have a tenon that fit into a recess in the rails 103. The intumescent material 106 and grooves 107 are preferably aligned with the tenons 108. It is understood that the tenons 104 and recesses 105 may be employed alone or in combination with the tenons 108 and recesses 109.

Figure 4:
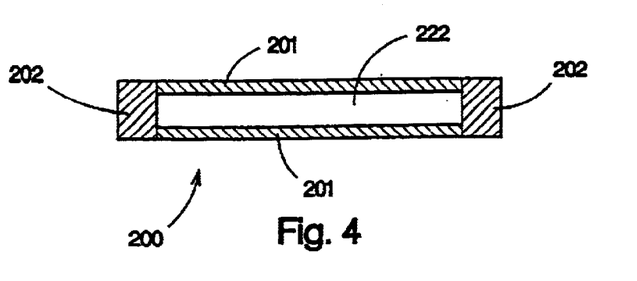
FIG. 4 is a cross-sectional view of a second embodiment of the fire door.

As best illustrated in FIG. 4, the fire door 200 according to a second embodiment of the invention has two subcores 201 that are disposed parallel to one another and enclose a space 222 therebetween which is also bounded on each side by a stile 202. Alternatively, the space 222 may also contain any material conventionally used for insulating doors, such as rock wool, calcium board, and the like. The thickness of each of the stiles 202 and rails is approximately equal to the sum of the thicknesses of the two cores 201 and the space 222 in between the two subcores 201. The fire door 200 is designed to be a 30 minute fire door according to tests in accordance with UL 10C (1998), NFPA 252 (1995), OR UBC 7-2 (1997).

Figure 5:
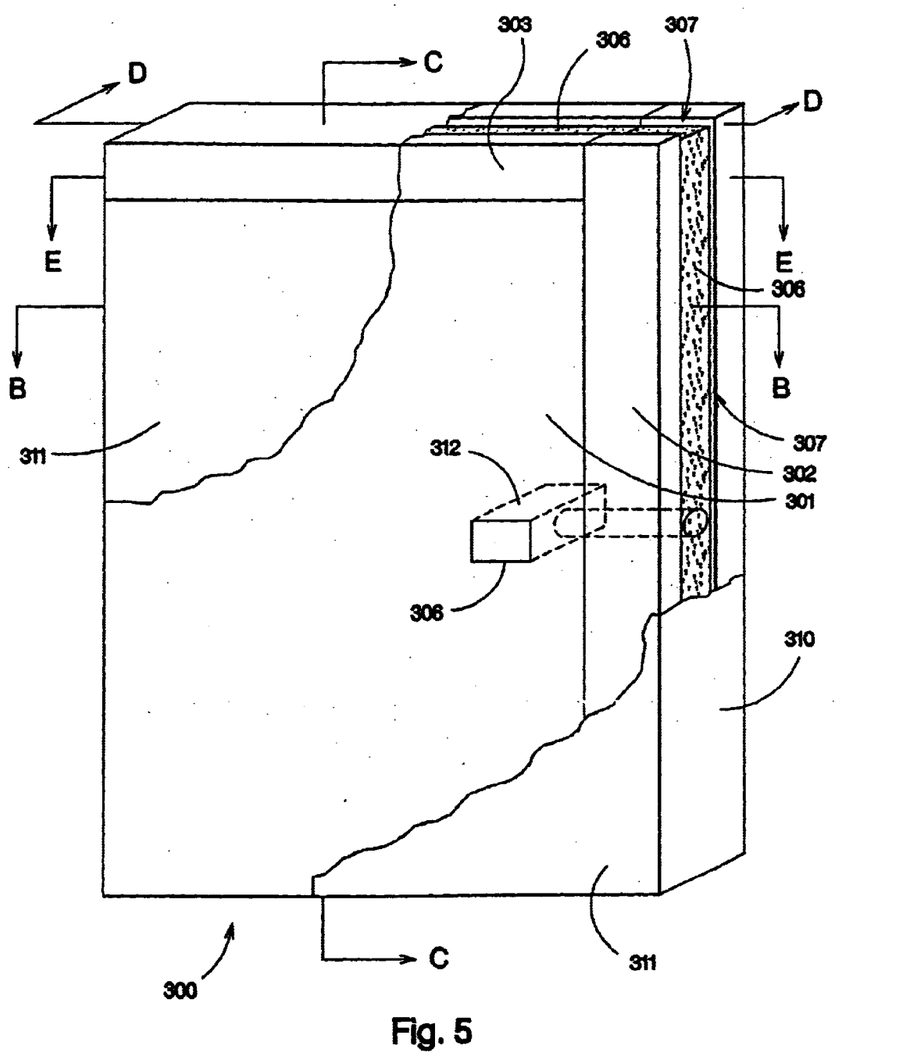
FIG. 5 is a perspective view of a third embodiment of the fire door of with portions broken away.

As best shown in FIG. 5, the fire door 300 according to a third embodiment of the invention has protective layers 310 (partially broken away to show stiles 302 and rails 303) overlying intumescent material 306 disposed in grooves 307 formed in each of the outward-facing edges of the stiles 302 and rails 303. The fire door 300 also has decorative layers 311 (partially broken away to show core 301, stiles 302 and rails 303) overlying front and back faces of the core 301. It is not essential that the protective layers 310 cover all of the outward-facing edges of the stiles 302 and rails 303, and thus a protective layer may be omitted from the outward-facing edge of the bottom rail 303 and/or the outward-facing edge of the top rail 302. The protective layers 310 help to contain the intumescent material 306 from being dislodged, and both the protective layers 310 and decorative layers 311 allow the fire door 300 to have a more aesthetically pleasing appearance. The protective layers 310 and decorative layers 311 maybe embossed, and may be made of particle board, hardboard, medium density fiberboard, melamine resin, a veneer, a hardwood such birch or oak, or a high pressure laminate and the like. Each of the protective layers 310 and decorative layers 311 may be secured to the core 301 using an adhesive, such as a polyurethane or polyvinyl acetate glue. Suitable adhesives include Dura-Pur UL 1062 and G 2424 H available from IFS, and Jet-Weld TE-200 available from Minnesota Mining and Manufacturing Corporation.

The fire door 300 also has a lock assembly 312 inserted in opening 320 formed through the decorative layers 311 and core 301, and opening 321 formed through one of the protective layers 310 and also-partially through the core to opening 320. The lock assembly 312 may be any one of many conventional lock assemblies, and is preferably a mortise lock assembly. Intumescent material 306 may also be provided on all outward-facing edges of the lock assembly 312 at the interface of the lock assembly 312 and the core 301, as well as at the interface of the lock assembly 312 and the decorative layers 311, before securing the lock assembly in the hole. The fire door 300 is designed to be a 90 minute fire door according to tests in accordance with UL 10C (1998), NFPA 252 (1995), OR UBC 7–2 (1997).

As best illustrated in FIGS. 5A, 5B, 5C, 5D and 5E, stiles, stile tenons, rails, rail tenons, a core and core recesses fit together in a preferred configuration. In order to more clearly show how these stiles, stile tenons, rails, rail tenons, a core and core recesses fit together, the decorative layers 311 have been broken away in FIG. 5A.

Figure 5A:
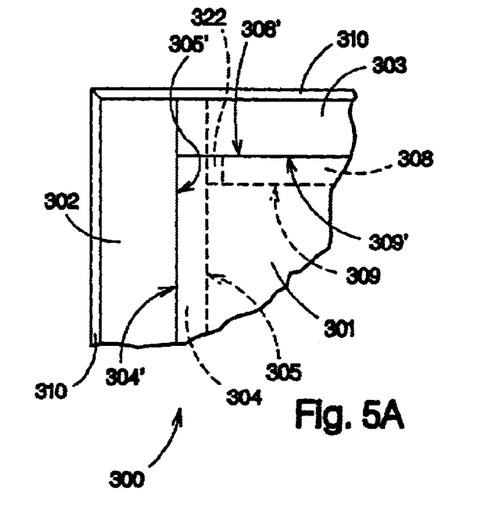
FIG. 5A is a fragmentary plan view of FIG. 5 with portions broken away and dotted lines illustrating hidden features.
Figure 5B:
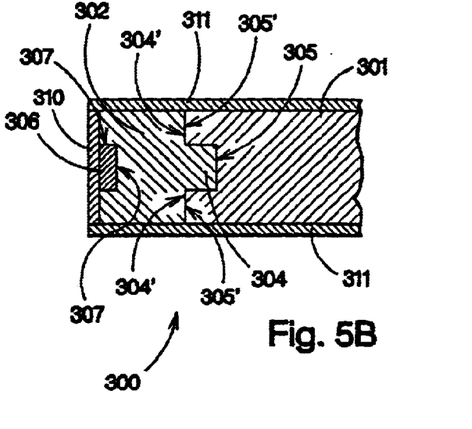
FIG. 5B is a fragmentary cross-sectional view taken along the line B—B of FIG. 5.
Figure 5C:
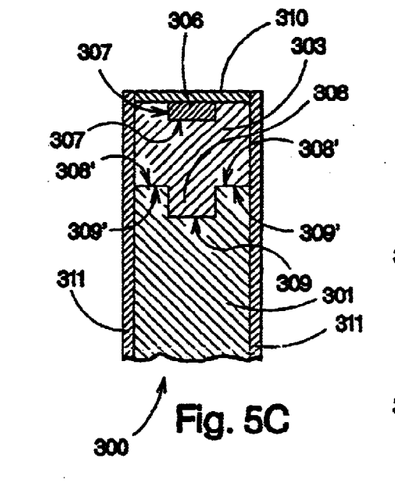
FIG. 5C is a fragmentary cross-sectional view taken along the line C—C of FIG. 5.
Figure 5D:
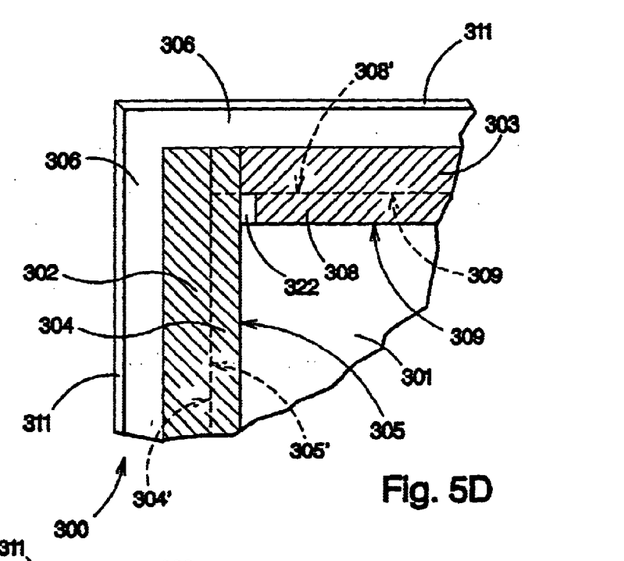
FIG. 5D is a fragmentary cross-sectional view taken along the line D—D of FIG. 5 with dotted lines illustrating hidden features.
Figure 5E:
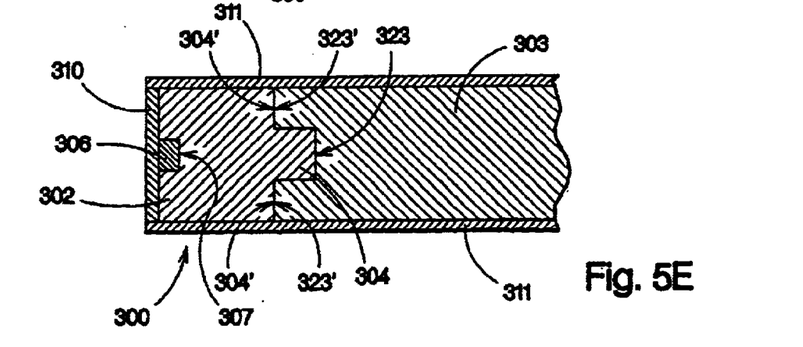
FIG. 5E is a fragmentary cross-sectional view taken along the line E—E of FIG. 5.

As best shown in FIGS. 5A, 5B, and 5D, each of the stiles 302 has a tenon 304 that fits inside a recess 305 formed in the core 301. Each of the stiles 302 also has edges 304' that abut against core edges 305'. Because the stiles 302 and their associated tenons 304 are longer than the core 301 and its associated recesses 305, the stiles 302 and their associated tenons 304 extend longitudinally above and below the core 301 and its associated recesses 305.

As best shown in FIG. 5A, each of the rails 303 also has a tenon 308 that fits inside a recess 309 that is formed in the core 301. Each of the rails 303 also has edges 308' that abut against core edges 309'. While each of the rail edges 308' extends the entire length of the rail, each of the tenons 308 does not extend the entire length of the rails 303.

The portions of each of the tenons 304 that extend either above or below the core 301 and associated recesses 305 are configured to fit inside side recesses 323 formed in ends of the rails 303. Adjacent the portions of each of the tenons 304 that extend either above or below the core 301 and associated recesses 305 are the stile non-tenon edges 304' that abut against rail non-tenon side edges 323'. At the junction of a rail tenon 308, a stile tenon 304 and the core 301, is a space 322. It is understood that it is not essential to the invention that the stiles, rails and core fit together in the manner illustrated by FIGS. 5A, 5B, 5C, 5D and 5E. Additionally, one skilled in the art would understand that other configurations are possible.

As shown in FIG. 7, the fire door 500 according to a fifth embodiment of the invention has first, second and third core portions 501, 514, 515, two stiles 502 and two rails 503. Because 70 percent of all fire doors have the same size, when a fire door larger than this size is needed, correspondingly larger cores are needed. In order to lower equipment and production costs, the same size mold is preferably used to make slabs for use in a variety of fire doors with different sizes. This mold preferably has a size corresponding to the cores found in 70% of all fire doors. With this in mind, a first core portion 501 is provided having a size corresponding to the cores found in 70% of fire doors. Second and third core portions 514 and 515 are also provided wherein second and third core portions 514 and 515 are cut from a slab of lower density RBEV composite. The first core portion 501 is secured with an adhesive to the second and third core portions 514, 515, thus providing a wider and taller door. The adhesive may be a hot melt adhesive, a polyurethane glue, a polyvinyl acetate glue, and the like.

As illustrated in FIG. 8, the fire door 600 according to a sixth embodiment of the invention has two cores 601 disposed side-by-side, two stiles 602 which bound the cores 601 therebetween, and two rails. The two cores 601 may be secured to one another using an adhesive such as a hot melt adhesive, a polyurethane glue, a polyvinyl acetate glue, and the like.

The fire doors 500, 600 are also designed to be 90 minute fire doors according to tests in accordance with UL 10C (1998), NFPA 252 (1995), OR UBC 7-2 (1997).

FIG. 6 illustrates a fourth embodiment of the invention. In the fire door 400, there is a hollow space 422 in between the core 401 and the two decorative layers 411. The core 401 fits into a recess 413 in each of the stiles 402. The fire door 400 is designed to be a 30 minute fire door according to tests in accordance with UL 10C (1998), NFPA 252 (1995), OR UBC 7-2 (1997).

Each of the fire doors may be assembled in the following manner. A slab of higher density RBEV composite is provided, wherein this slab is intended for a pair of stiles and a pair of rails. A slab of lower RBEV composite is also provided, whereas this slab is intended for a core, and is preferably generally rectangular. The slab of higher density RBEV is machined or cut in a conventional manner to provide a pair of stiles and a pair of rails, thus the stiles and rails have substantially the same density. Alternatively, the stiles and rails could be cut or machined from different slabs of higher density RBEV composite, but it is still preferred that the rails and stiles have substantially the same density. Preferably, the density of the stiles and rails is substantially twice that of the core. The core is then machined square using any tool known in the art for such a purpose, including a grinder or saw. Recesses are then machined into the outward-facing edges of the core into which tenons may later be inserted.

After machining the recesses into the core, tenons are machined out of the inward-facing edges of the rails and stiles. It is understood that while tenons and recesses are preferred, they are not essential to the invention and may be omitted. It is also understood that while the rail or stile tenon and core recess configuration is preferred, the tenon joint may be reversed, i.e., recesses may be machined into the inward-facing edges of the rails and stiles, while tenons may be machined out of the outward-facing edges of the core.

If grooves for holding an intumescent material are desired, grooves are then cut into the outward-facing edges of the stiles and rails. Whether or not grooves are desired, an intumescent material is either applied to the outward-facing edges of the rails and stiles or within the grooves. As discussed previously, it is not essential to the invention to provide grooves and intumescent material on all of the outward-facing edges of the top rail and the stiles.

If protective layers are desired, the protective layers are next secured to the outward-facing edges of the rails and stiles over any intumescent material and grooves using any known adhesive such as hot melt adhesive, polyurethane glue, polyvinyl acetate glue, and the like. The adhesive between the protective layers and the rails and stiles is then allowed to fully cure After the core, stiles and rails have been machined and protective layers have been glued and cured as described above, each of the outward-facing edges of the core and the inward-facing edges of the rails and stiles are secured to one another with any known adhesive including hot melt adhesive, polyurethane glue, polyvinyl acetate glue and the like. The adhesive on this glued assembly is then allowed to fully cure.

Both the front face and rear face of the cured glued assembly should be sanded until flush. Decorative layers are provided on both the sanded front face and rear face of the cured, glued assembly by securing them with an adhesive. The adhesive securing the decorative layers is then allowed to fully cure. Once cured, the door width and length are machined with a twin saw or double end tenor to provide a trued rectangle. The decorative layers may be formed from medium density fiberboard, embossed medium density fiberboard, hardboard, melamine resin, veneer, particle board, and high pressure laminate.

Once the door is trued, a three degree chamfer is optionally cut into the edge of the door opposite the hinges to assist clearance in closing the door once mounted. After chamfering, a hole for the lock assembly is cut into the door. Intumescent material is provided on the inside edge of the hole and the outward-facing edges of the portion of the lock assembly that are to be inserted into the door. The portion of the lock assembly for fitting inside the door is then carefully inserted into the hole and the remainder of the lock assembly assembled. Finally, door hardware such as hinges and hangers are installed.

EXAMPLES

Screw-pull strength test: Size 12 metal wood screws, 1 inch in length, are driven into the outward-facing edge of a sample, and the force required to pull out the screw was measured.

Example 1

Two higher density RBEV composite slabs were prepared according to the invention, such that one slab had a grain whose orientation was orthogonal to an outward-facing edge of that slab, and the other slab had a grain whose orientation was parallel to an outward-facing edge of that slab. The first slab exhibited a screw-pull strength of 960 pounds vs. only 350 pounds for the second slab.

Example 2

A RBEV composite slab was prepared according to the invention, such that it had a density of about 1100 kg/m$^3$ and a novolac resin content of about 8% by wt. of the slab. The slab exhibited a screw-pull strength of about 1000 pounds.

Having thus described the invention, it will be realized that although the foregoing description of the inventor's preferred embodiment includes specific quantities, materials and procedures, modifications and variations thereof might be employed without departing from the inventive concept herein.

I claim:

1. A fire door, comprising:
   a) a generally rectangular core formed of resin bonded exfoliated vermiculite having a predetermined density; and
   b) a pair of stiles secured to and extending along opposed edges of said core and a pair of rail's secured to and extending along opposed edges of said core, said stiles and said rails formed of resin bonded exfoliated vermiculite having a density exceeding the density of said core.

2. The fire door of claim 1, wherein:
   a) said stiles and said rails have substantially the same density.

3. The fire door of claim 2, wherein.
   a) the density of said stiles and said rails is substantially twice the density of said core.

4. The fire door of claim 2, wherein:
   a) the vermiculite forming said stiles is oriented in a plurality of aligned layers, and said layers are disposed parallel to the associated edge of said core.

5. The fire door of claim 4, wherein:
   a) the vermiculite forming said rails is oriented in a plurality of aligned layers, and said rail layers are disposed perpendicularly to the layers of said stiles.

6. The fire door of claim 5, wherein:
   a) said stiles and said rails are formed from less resin than is used to form said core.

7. The fire door of claim 1, wherein:
a) said stiles and said rails are adhesively bonded to said core.

8. The fire door of claim 7, wherein:
a) said stiles and said rails are bonded to said core by one of a hot melt adhesive, a polyurethane adhesive, and a PVA adhesive.

9. The fire door of claim 1, wherein:
a) each of said stiles and one rail has an exposed edge and
b) an intumescent material is disposed upon said edges.

10. The fire door of claim 1, wherein:
a) at least one of said core edges, stiles or rails has a recess formed therein and extending there along, at least one of said core edges, stiles and said rails has a tenon, and each of said tenons is adapted to be received within an associated recess.

11. The fire door of claim 10, wherein:
a) said recess is formed in at least one of said core edges; and
b) at least one of said stiles and rails has a tenon.

12. The fire door of claim 10, wherein:
a) said recess is formed in at least one of said stiles and rails; and
b) at least one of said core edges has a tenon.

13. The fire door of claim 10, wherein:
a) said tenons are adhesively bonded to the assorted recesses.

14. The fire door of claim 13, wherein:
a) each of said stiles has an exposed edge, and an intumescent material is disposed upon said edges.

15. The fire door of claim 14, wherein:
a) said intumescent material is encapsulated.

16. The fire door of claim 15, wherein:
a) a protective layer overlies said intumescent material and is secured to the associated stile.

17. The fire door of claim 1, wherein:
a) a decorative layer overlies at least one major surface of said core and is secured to said stiles and said rails.

18. The fire door of claim 17, wherein:
a) said decorative layer is one of a medium density fiberboard, an embossed medium density fiberboard, hardboard, melamine resin, veneer, particle board and high pressure laminate.

19. The fire door of claim 18, wherein:
a) said decorative layer is adhesively secured to said core.

20. The fire door of claim 18, wherein:
a) said veneer is spaced from said core.

21. The fire door of claim 19, wherein:
a) said stiles and said rails span the thickness of said core.

22. The fire door of claim 1, wherein:
a) said core is disposed into at least two subcores, and said subcores are adhesively secured together.

23. The fire door of claim 22, wherein:
a) each of said subcores is generally rectangular.

24. The fire door of claim 1, wherein:
a) said core is disposed into at least two subcores, said subcores being disposed parallel to one another and spaced apart from one another, said subcores enclosing a space therebetween.

25. A fire door comprising:
a) at least a first rectangular core formed of resin bonded exfoliated vermiculite, said core having first and second major surfaces and four peripheral edges;
b) a recess formed in and extending along each of said edges;
c) a pair of stiles and a pair of rails, each of said stiles and said rails formed from resin bonded exfoliated vermiculite and each of said stiles and said rails has a tenon extending therefrom; and
d) each of said tenons adhesively secured within an associated one of said recesses.

26. The fire door of claim 25, wherein:
a) said stiles and said rails have a density exceeding the density of said core.

27. The fire door of claim 26, wherein:
a) the density of said stiles and said rails is substantially twice the density of said core.

28. The fire door of claim 25, wherein:
a) each of said stiles and said rails is disposed as a series of oriented layers, the layers of said stiles disposed parallel to the associated edge.

29. The fire door of claim 28, wherein:
a) the layers of said rails are disposed perpendicularly to the layers of said stiles.

30. The fire door of claim 25, wherein:
a) each of said stiles and one of said rails has an exposed edge; and
b) an intumescent material is disposed upon each of said edges.

31. The fire door of claim 30, wherein:
a) each of said grooves is aligned with the associated tenon.

32. The fire door of claim 25, wherein:
a) a decorative material overlies said core along each of said major surfaces.

33. The fire door of claim 32, wherein:
a) said decorative material is one of an embossed veneer, a hardboard veneer, a medium density fiberboard veneer, melamine resin veneer, a high pressure laminate veneer.

34. The fire door of claim 33, wherein:
a) said veneer is secured to said major surfaces with one of a polyurethane adhesive and PVA adhesive, and said tenons are secured to the associated recesses with a hot melt adhesive.

35. The fire door of claim 25, wherein:
a) said core is comprised of a plurality of generally rectangular subcores, said subcores being adhesively secured together.

36. Method of assembling a fire door, comprising the steps of:
a) providing a generally rectangular door core formed from resin bonded exfoliated vermiculite;
b) providing a pair of rails and a pair of stiles formed from resin bonded exfoliated vermiculate;
c) adhesively securing the stiles and rails to the peripheral edges of the core.

37. The method of claim 35, further comprising the steps of:
a) forming grooves each of the stiles and in at least one of the rails, the grooves extending an along outward-facing edge of each of the stiles and an outward-facing edge of at least one of the rails;
b) providing encapsulated intumescent material; and
c) securing the encapsulated material in the grooves of the stiles and the groove of the at least one rail.

38. Method of assembling a fire door, comprising the steps of:

a) providing a generally rectangular door core formed from resin bonded exfoliated vermiculite;

b) providing a pair of rails and a pair of stiles formed from resin bonded exfoliated vermiculate, the stiles and rails each having an exposed edge;

c) adhesively securing the stiles and rails to the peripheral edges of the core so that the grooves are exteriorly disposed;

d) providing encapsulate intumescent material; and e) securing the encapsulated material upon each of said stile exposed edges and upon at least one of said rail exposed edges.

39. A fire door, comprising:

a) a generally rectangular core formed of resin bonded exfoliated vermiculite, said core having a predetermined moisture content; and b) a pair of stiles secured to and extending along opposed edges of said core and a pair of rails secured to and extending along opposed edges of said core, said stiles and said rails formed of resin bonded exfoliated vermiculite, said stiles and said rails having a moisture content differing from the moisture content of said core.

40. The fire door of claim 39, wherein:

a) the resin bonded vermiculite of said core having a density different than the density of the resin bonded vermiculite forming said stiles and said rails.

41. The fire door of claim 40, wherein:

a) the density of the resin bonded vermiculite forming said stiles and said rails is approximately twice the density of the resin bonded vermiculite forming said core.

42. The fire door of claim 41, wherein:

a) the density of the resin bonded vermiculite forming said stiles and said rails is from about 900 to about 1,300 kg/m$^3$ and the density of the resin bonded vermiculite forming said core is from about 350 to about 600 kg/m$^3$.

43. The fire door of claim 39, wherein:

a) the resin bonded vermiculite forming said core comprises from about 10–50% by weight hydraulic binder, from about 8–20% by weight resin, from about 0–5% by weight fibrous reinforcement, and from about 50–70% by weight exfoliated vermiculite, and the resin bonded vermiculite forming said stiles and rails comprising from about 1–30% by weight hydraulic binder, from about 5–12% by weight resin, from about 5–20% by weight fibrous reinforcement, and from about 55–85% by weight exfoliated vermiculite.

44. The fire door of claim 43, wherein:

a) the vermiculite of said stiles, said rails, and said core being sized so that 0–about 15% by weight is 0.6 mm or larger, 0–20% by weight is between 0.3 mm and 0.6 mm, and 30–76% by weight is between 0.15 mm and 0.3 mm.

45. A fire door, comprising:

a) a generally rectangular core formed of resin bonded exfoliated vermiculite, said core having a predetermined amount of chemically bound water; and b) a pair of stiles secured to and extending along opposed edges of said core and a pair of rails secured to and extending along opposed edges of said core, said stiles and said rails formed of resin bonded exfoliated vermiculite, said stiles and said rails having an amount of chemically bound water differing from the chemically bound water of said core.

46. The fire door of claim 45, wherein, the density of the resin bonded exfoliated vermiculite of said core differs from the density of the resin bonded exfoliated vermiculite of said stiles and rails.

47. The fire door of claim 46, wherein the density of the resin bonded exfoliated vermiculite of said stiles and rails exceeds the density of the resin bonded exfoliated vermiculite of said core.

* * * * *